(12) United States Patent
Holroyd et al.

(10) Patent No.: US 12,123,364 B2
(45) Date of Patent: Oct. 22, 2024

(54) CONTROL SYSTEM AND METHOD FOR CONTROLLING OPERATION OF AN INTERNAL COMBUSTION ENGINE

(71) Applicant: JAGUAR LAND ROVER LIMITED, Warwickshire (GB)

(72) Inventors: Craig Holroyd, Coventry (GB); Claudio Cascone, Coventry (GB)

(73) Assignee: JAGUAR LAND ROVER LIMITED, Coventry (GB)

( * ) Notice: Subject to any disclaimer, the term of this patent is extended or adjusted under 35 U.S.C. 154(b) by 0 days.

(21) Appl. No.: 18/332,043

(22) Filed: Jun. 9, 2023

(65) Prior Publication Data

US 2023/0313746 A1    Oct. 5, 2023

Related U.S. Application Data

(63) Continuation of application No. 17/599,106, filed as application No. PCT/EP2020/057096 on Mar. 16, 2020, now Pat. No. 11,686,260.

(30) Foreign Application Priority Data

Mar. 29, 2019  (GB) ...................... 1904406

(51) Int. Cl.
 *F02D 13/02* (2006.01)
 *F02D 41/00* (2006.01)
 (Continued)

(52) U.S. Cl.
 CPC ..... *F02D 13/0226* (2013.01); *F02D 13/0223* (2013.01); *F02D 13/0234* (2013.01);
 (Continued)

(58) Field of Classification Search
 CPC ............ F02D 13/0226; F02D 13/0223; F02D 13/0234; F02D 41/009; F02D 41/10;
 (Continued)

(56) References Cited

U.S. PATENT DOCUMENTS

| 2004/0134449 A1 | 7/2004 | Yang |
| 2008/0110439 A1 | 5/2008 | Sugimoto |
| 2016/0061140 A1 | 3/2016 | Hotta |

FOREIGN PATENT DOCUMENTS

| DE | 10111260 A1 | 9/2002 |
| EP | 2067968 A1 | 6/2009 |

(Continued)

OTHER PUBLICATIONS

Combined Search and Examination Report under Sections 17 and 18(3) for Application No. GB1904406.4 dated Oct. 1, 2019.

(Continued)

*Primary Examiner* — Audrey B. Walter
(74) *Attorney, Agent, or Firm* — Carlson, Gaskey & Olds, P.C.

(57) ABSTRACT

A control system for controlling operation of an internal combustion engine is configured to: receive a first request signal indicative of first torque demand; determine a schedule defining an opening timing of the intake valve and a closing timing of the intake valve of a cylinder of the internal combustion engine in dependence on the first torque demand; and cause the intake valve to open in accordance with the schedule. The control system is also configured to, during a period in which the intake valve is open: receive a second torque request signal indicative of a second torque demand different to the first torque demand; determine an updated schedule defining an updated closing timing of the intake valve in dependence on the second torque demand; and cause the intake valve to close in accordance with the updated schedule.

17 Claims, 11 Drawing Sheets

(51) Int. Cl.
 *F02D 41/10* (2006.01)
 *F02D 41/40* (2006.01)
(52) U.S. Cl.
 CPC .......... *F02D 41/009* (2013.01); *F02D 41/10* (2013.01); *F02D 41/401* (2013.01); *F02D 2041/001* (2013.01); *F02D 2200/1002* (2013.01); *F02D 2200/101* (2013.01); *F02D 2250/12* (2013.01); *F02D 2250/21* (2013.01)
(58) Field of Classification Search
 CPC ............ F02D 41/401; F02D 2041/001; F02D 2200/1002; F02D 2200/101; F02D 2250/12; F02D 2250/21
 See application file for complete search history.

(56) References Cited

FOREIGN PATENT DOCUMENTS

| | | |
|---|---|---|
| EP | 3388653 A1 | 10/2018 |
| WO | 2017/023333 A1 | 2/2017 |

OTHER PUBLICATIONS

International Search Report and Written Opinion of the International Searching Authority for International application No. PCT/EP2020/057096 dated Jun. 16, 2020.

CONTROL SYSTEM AND METHOD FOR CONTROLLING OPERATION OF AN INTERNAL COMBUSTION ENGINE

CROSS REFERENCE TO RELATED APPLICATIONS

This application is a continuation of U.S. patent application Ser. No. 17/599,106, filed on Sep. 28, 2021 (now U.S. Pat. No. 11,686,260), which is the national stage application of International Application No. PCT/EP2020/057096, filed on Mar. 16, 2020, which claims priority to United Kingdom Application No. GB 1904406.4, filed on Mar. 29, 2019.

TECHNICAL FIELD

The present disclosure relates to a control system for controlling operation of an internal combustion engine, an internal combustion engine, a vehicle, a method and a non-transitory computer readable medium. In particular, but not exclusively it relates to a control system for controlling operation of an internal combustion engine, an internal combustion engine, a vehicle, a method and a non-transitory computer readable medium in road vehicles, such as cars.

BACKGROUND

In recent times vehicles have been produced that have internal combustion engines with an active valve system that enables intake valves to be opened with varying lift height and/or duration in accordance with signals received by a control system. Prior to the intake stroke of a cylinder for which an intake valve is actuated by an active valve system, the control system must determine when in the engine cycle the intake valve is to be opened, when the intake valve is to be closed, how much air and fuel is contained within the cylinder after the intake valve has been closed, and when in the engine cycle the air-fuel mixture is to be ignited. The timing of opening and closing of the intake valve and the mass of fuel to be injected are determined in dependence on the torque demand most recently received by the control system.

In order to ensure that the determination of these parameters is completed before the intake valve may be required to be opened, the determination is begun during each combustion cycle at a specified crankshaft angle well in advance of the earliest crankshaft angle at which the intake valve may be required to be opened. Control systems are therefore known to determine these parameters during each power stroke that precedes the intake stroke in question.

A problem with this arrangement is that if a new and different torque request is received just after the determination is performed, it is a full combustion cycle before the controller is able to control combustion in the cylinder commensurate with the new torque request. The responsiveness of the vehicle is therefore not as rapid as it might be.

It is an aim of the present invention to address one or more of the disadvantages associated with the prior art.

SUMMARY OF THE INVENTION

Aspects and embodiments of the invention provide a control system for controlling operation of an internal combustion engine, an internal combustion engine, a vehicle, a method and a non-transitory computer readable medium as claimed in the appended claims.

According to an aspect of the invention there is provided a control system for controlling operation of an internal combustion engine, the control system comprising at least one controller and being configured to: receive a first request signal indicative of first torque demand; determine a schedule defining an opening timing of the intake valve and a closing timing of the intake valve of a cylinder of the internal combustion engine in dependence on the first torque demand; and cause the intake valve to open in accordance with the schedule; and during a period in which the intake valve is open: receive a second torque request signal indicative of a second torque demand different to the first torque demand; determine an updated schedule defining an updated closing timing of the intake valve in dependence on the second torque demand; and cause the intake valve to close in accordance with the updated schedule.

This provides the advantage that the amount of torque generated by the engine is rapidly adjusted in view of a changing torque demand. Therefore, for example, a vehicle comprising the control system is rendered more responsive to changes in torque demand resulting from manual adjustments to an accelerator pedal.

Optionally, said control system comprises an electronic processor having an electrical input for receiving said first request signal; and an electronic memory device electrically coupled to the electronic processor and having instructions stored therein, the electronic processor being configured to access the memory device and execute the instructions stored therein.

Optionally, the control system is configured to determine the updated schedule in dependence on the second torque request signal being received before an injection of fuel that is scheduled to start during said period in which the intake valve is open. This provides the advantage that a required ratio of fuel to air can be introduced into the cylinder during its intake stroke.

Optionally, the control system is configured to determine timing of said scheduled injection in dependence on the first torque demand. Optionally, the control system is configured to determine an updated schedule defining timing of injection of fuel and/or quantity of fuel to be injected in dependence on the second torque demand. This provides the advantage that the timing of the fuel injection may be optimized within the period in which the intake valve is open. Optionally, the control system is configured to determine whether the internal combustion engine has a speed of rotation below a threshold value and determine the updated schedule defining the updated closing timing of the intake valve in dependence on the internal combustion engine having a speed of rotation below the threshold value. This provides the advantage that the updated schedule is not produced if there is insufficient time to produce it.

Optionally, the control system is configured to: receive a timing signal indicating a current angle of a crankshaft of the internal combustion engine; determine a phase angle by which opening of the intake valve is advanced relative to angular position of the crankshaft; and determine the schedule defining the opening timing of the intake valve and the closing timing of the intake valve, at a time defined by a first selected angle of the crankshaft that depends on the phase angle. This provides the advantage that if the phase angle is relatively small, for example less than a threshold angle, then the determination of the timing for opening the intake valve may be delayed until a time just before the intake stroke of the cylinder. This allows torque demands that are received just before the intake stroke to be taken into account when determining the intake valve opening timing.

However, if the phase angle is relatively large, for example greater than a threshold angle, then the determination of the timing for opening the intake valve may be brought forward in time to ensure that the schedule is produced before the intake valve might be required to open.

Optionally, the control system is configured to determine an ignition timing in dependence on the opening timing of the intake valve and the updated closing timing of the intake valve. This provides the advantage that the ignition timing can be optimized for the mass of fuel and air in the cylinder when ignition takes place.

Optionally, the control system is operatively connected to a valve actuation means configured to cause opening of the intake valve of the cylinder of the internal combustion engine in dependence on a received signal and allow the crankshaft angle at which the intake valves are actuated to be varied.

Optionally, the valve actuation means comprises a continuously variable valve lift system. Optionally, the valve actuation means comprises a hydraulic system.

According to another aspect of the invention there is provided an internal combustion engine comprising the control system of any one of the previous paragraphs. According to a further aspect of the invention there is provided a vehicle comprising the control system according to any one of the previous paragraphs or the internal combustion engine according to the previous paragraph.

According to yet another aspect of the invention there is provided a method of controlling an internal combustion engine comprising: receiving a first request signal indicative of first torque demand; determining a schedule defining an opening timing of the intake valve and a closing timing of the intake valve for a cylinder of the internal combustion engine in dependence on the first torque demand; and causing the intake valve to open in accordance with the schedule; and during a period in which the intake valve is open: receiving a second torque request signal indicative of a second torque demand different to the first torque demand; determining an updated schedule defining an updated closing timing of the intake valve in dependence on the second torque demand; and causing the intake valve to close in accordance with the updated schedule. This provides the advantage that the amount of torque generated by the engine is rapidly adjusted in view of a changing torque demand. Therefore, for example, by employing the method a vehicle may be rendered more responsive to changes in torque demand resulting from manual adjustments to an accelerator pedal.

Optionally, the method comprises determining the updated schedule in dependence on the second torque request being received before an injection of fuel that is scheduled to start during said period in which the intake valve is open. This provides the advantage that a required ratio of fuel to air can be introduced into the cylinder during its intake stroke.

Optionally, the method comprises determining timing of said scheduled injection in dependence on the first torque demand. Optionally, the method comprises determining an updated schedule defining timing of injection of fuel and/or quantity of fuel to be injected in dependence on the second torque demand. This provides the advantage that the timing of the fuel injection may be optimized within the period in which the intake valve is open. Optionally, the method comprises determining whether the internal combustion engine has a speed of rotation below a threshold value and determining the updated schedule defining the updated closing timing of the intake valve only when the internal combustion engine has a speed of rotation below a threshold value. This provides the advantage that the updated schedule is not produced if there is insufficient time to produce it.

Optionally, the method comprises: receiving a timing signal indicating current angle of a crankshaft of the internal combustion engine; determining a phase angle by which opening of the intake valve is advanced relative to angular position of the crankshaft; and determining the schedule defining the opening timing of the intake valve and the closing timing of the intake valve, at a time defined by a first selected angle of the crankshaft that depends on the phase angle. This provides the advantage that if the phase angle is relatively small, for example less than a threshold angle, then the determination of the timing for opening the intake valve may be delayed until a time just before the intake stroke of the cylinder. This allows torque demands that are received just before the intake stroke to be taken into account when determining the intake valve opening timing. However, if the phase angle is relatively large, for example greater than a threshold angle, then the determination of the timing for opening the intake valve may be brought forward in time to ensure that the schedule is produced before the intake valve might be required to open.

Optionally, the method comprises performing said determining an updated schedule defining an updated closing timing of the intake valve, at a time defined by a second selected angle of the crankshaft.

Optionally, the method comprises determining an ignition timing in dependence on the opening timing of the intake valve and the updated closing timing of the intake valve. This provides the advantage that the ignition timing can be optimized for the mass of fuel and air in the cylinder when ignition takes place.

According to yet another aspect of the invention there is provided a method of controlling operation of intake valves of an internal combustion engine, the method comprising: receiving first schedule data indicative of when opening of an intake valve of a cylinder of the internal combustion engine is to be performed; causing opening of the intake valve at a time defined by the first schedule data; during a period in which the intake valve is open, receiving second schedule data indicative of when closing of the intake valve is to be performed; and causing closing of the intake valve at a time defined by the second schedule data. This provides the advantage that the amount of torque generated by the engine may be rapidly adjusted. Therefore, for example, by employing the method a vehicle may be rendered more responsive to changes in torque demand resulting from manual adjustments to an accelerator pedal.

According to a yet further aspect of the invention there is provided a valve control module for controlling operation of an intake valve of a cylinder of an internal combustion, wherein the valve control module is configured to perform the method of the previous paragraph. Optionally, the first schedule data is indicative of when closing of the intake valve is to be performed, and the method comprises causing closing of the intake valve at a time defined by the first schedule data during a combustion cycle in which second schedule data is not received.

According to yet another aspect of the invention there is provided a non-transitory computer readable medium comprising computer readable instructions that, when executed by a processor, cause performance of a method according to any one of the previous paragraphs.

According to yet another aspect of the invention there is provided a valve control module for controlling operation of an intake valve of a cylinder of an internal combustion, wherein the valve control module is configured to: receive first schedule data indicative of when opening of an intake valve of a cylinder of the internal combustion engine is to be performed; cause opening of the intake valve at a time defined by the first schedule data; during a period in which the intake valve is open within at least one combustion cycle, receive second schedule data indicative of when closing of the intake valve is to be performed; and cause closing of the intake valve at a time defined by the second schedule data. Optionally, the first schedule data is indicative of when closing of the intake valve is to be performed, and the valve control module is configured to: cause closing of the intake valve at a time defined by the first schedule data during a combustion cycle in which second schedule data is not received.

The apparatus may be for use within a vehicle such as a car or other road vehicle.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

One or more embodiments of the invention will now be described, by way of example only, with reference to the accompanying drawings, in which.

DETAILED DESCRIPTION

A vehicle 100, a control system and valve control module in accordance with an embodiment of the present invention is described herein with reference to the accompanying FIGS. 1 to 11.

Figure 1:
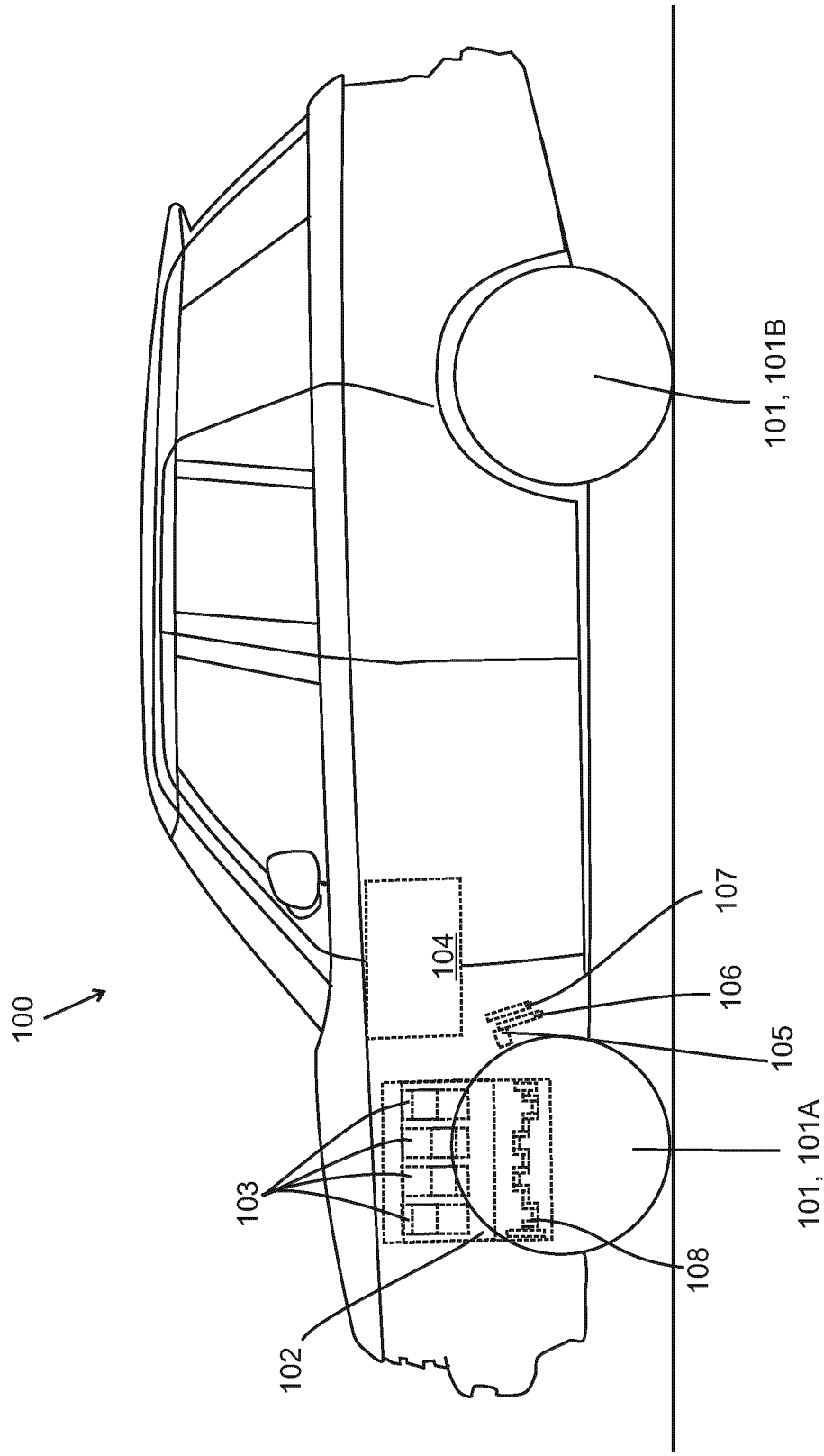
FIG. 1 shows a vehicle embodying the present invention.

With reference to FIG. 1, the vehicle 100 is a road vehicle in the form a car having four road wheels 101; two front wheel 101A and two rear wheels 101B. In the present embodiment, at least the rear road wheels 101B are driven by an internal combustion engine 102 (referred to below as the engine 102), but in other embodiments the front wheels 101A may be driven rather than the rear wheels 101B.

The engine 102 comprises a crankshaft 108 and several cylinders 103 in which combustion of fuel takes place in order to cause rotation of the crankshaft 108 and generate torque for driving the vehicle 100 over ground. The engine 102 shown in FIG. 1 has 4 cylinders 103, but in alternative embodiments the engine 102 may have more or fewer than 4 cylinders 103. Operation of the engine 102 is controlled by a control system 104. The control system 104 is configured to receive signals indicative of torque that is requested to be generated by the engine 102 and to control operation of the engine 102 to cause it to generate the requested torque when possible. Signals requesting engine torque may be received from, for example, an accelerator pedal sensor 105 that is arranged to monitor position of an accelerator pedal 106 and provide the control system 104 with signals indicative of the position of the accelerator pedal 106.

The vehicle 100 also comprises a brake pedal 107, forming a part of a brake system (301 shown in FIG. 2) to enable a user to provide inputs to slow the vehicle 100 down, and the control system 104 also receives signals from the brake system. The control system 104 may comprise a single electronic control unit or may be distributed over several electronic control units. The one or more control units may comprise a single electronic processor or several electronic processors that operate in combination to perform tasks required to control operation of the engine 102.

Figure 2:
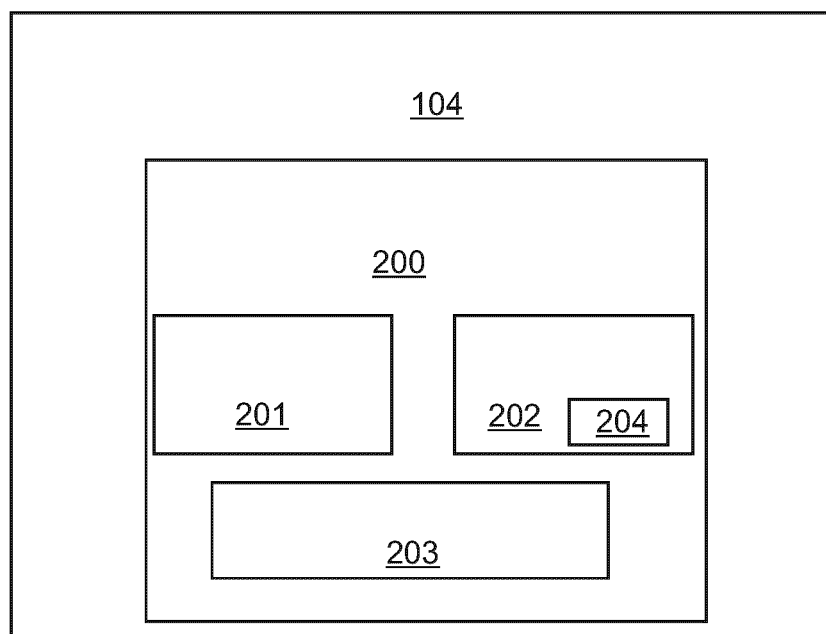
FIG. 2 shows a schematic diagram of a control system.

By way of example, the control system 104 of the present embodiment is shown schematically in FIG. 2. The control system 104 comprises a single control unit 200, which comprises an electronic processor 201, an electronic memory device 202 and input/output means 203. The memory device 202 stores instructions 204 accessible by the processor 201 and which when performed by the processor 201 cause it to provide a scheduling means (305 in shown FIG. 3) and a valve control module (VCM 308 shown in FIG. 3) to perform the methods described below to control operation of the engine 102. Via its input/output means 203, the control system 104 is configured to receive signals indicating requests for torque to be generated by the engine 102 and other signals indicative of various parameters of the engine 102, as is known. The input/output means 203 also enable the control system 104 to output signals for controlling operation of the engine 102. The input/output means 203 may comprise several input ports and several output ports, each connected to different components of the vehicle 100, and/or may comprise one or more transceivers configured to connect to one or more data buses (such as a controller area network bus) of the vehicle 100 to enable communication to other components of the vehicle 100 connected to the bus(es).

Figure 3:
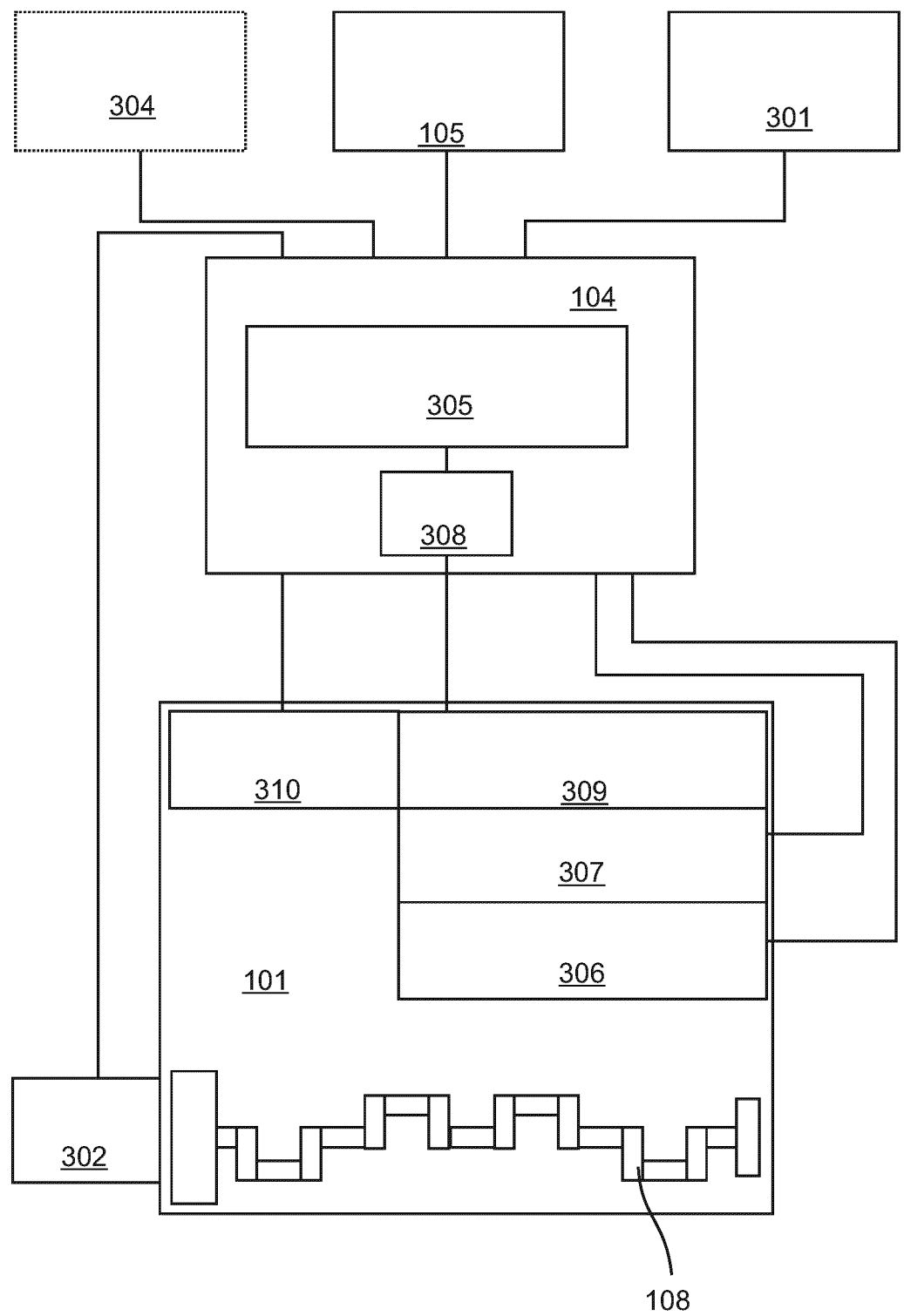
FIG. 3 shows schematically the control system and component parts of the engine.

The control system 104 and the engine 102 are shown schematically in FIG. 3. As mentioned above, the control system 104 is configured to receive signals from the accelerator pedal sensor 105, the brake system 301 and it also receives signals from a sensing device 302 on the engine 102 that is configured to sense the angular position of the crankshaft 108 of the engine 102. The control system 104 may be configured to receive other input signals, some of which may be indicative of a request to provide an amount of engine torque. For example, the control system 104 may be configured to receive input signals from an ADAS system (i.e. an advanced driver assistance system) 304.

The control system 104 comprises a scheduling means 305 that is configured to determine from received signals a required torque to be generated by the engine 102, and determine a mass of air and a mass of fuel that should be provided to each cylinder 103 of the engine 102 to generate the required torque. The scheduling means 305 is configured to determine schedules for each cylinder 103 of the engine 102 defining when, during their combustion cycle, their intake valves (402 in FIG. 4) are to be opened and closed, when fuel is to be injected by a fuel injection system 306 and when combustion is to be initiated by an ignition system 307.

In the present embodiment, the control system 104 also comprises a valve control module (VCM) 308. The scheduling means 305 provides schedule data to the VCM 308 indicating when, in terms of angles of the crankshaft 108, the intake valves of the engine 102 are required to be opened and closed. The VCM 308 is configured to receive the schedule data and signals from the sensing device 302 indicative of the angle of the crankshaft 108, and output signals to a valve actuation means 309 to cause it to open and close the intake valves (402 in FIG. 4) of the engine 102 at the crankshaft angles required by the schedule data.

The valve actuation means 309 is a mechanism configured to cause opening and closing of the intake valves (402 in FIG. 4) at various angles of the crankshaft 108 to cause the mass of air drawn into the cylinders 103 to be adjusted. In the present embodiment, the valve actuation means 309 comprises a continuously variable valve lift CVVL system, but in other embodiments it may comprise a discrete valve lift system.

In the present embodiment, the engine 102 also comprises a cam phasing means 310 to enable the times at which the intake valves are opened to be advanced.

Figure 4:
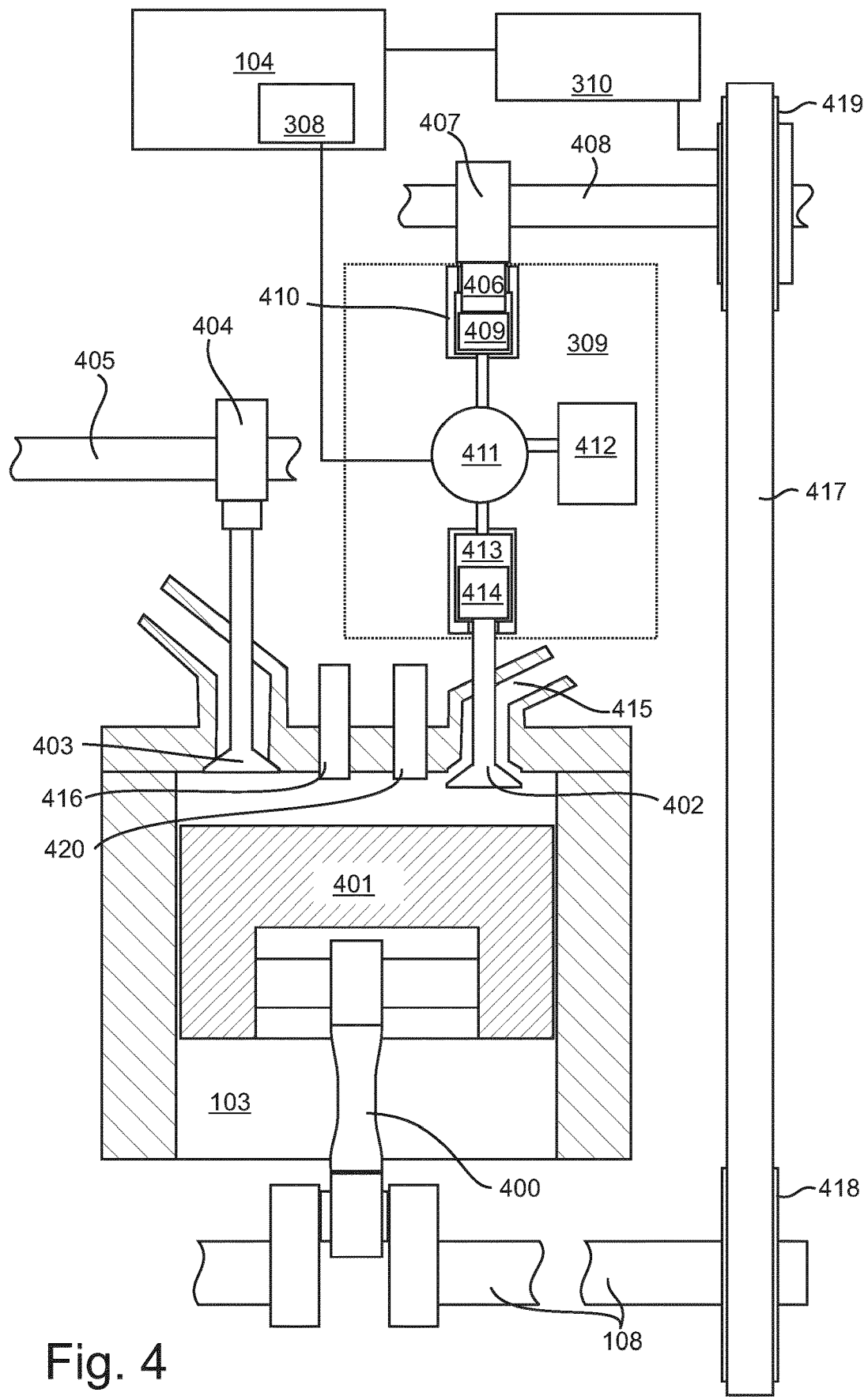
FIG. 4 shows one of the cylinders of the engine and mechanisms by which an intake valve and an exhaust valve of the cylinder are actuated.

One of the cylinders 103 of the engine 102, which contains a piston 401 connected to the crankshaft 108 via a connecting rod 400, is shown somewhat schematically in FIG. 4. FIG. 4 also shows the mechanisms by which an intake valve 402 and an exhaust valve 403 of the cylinder 103 are actuated. It should be understood that although only one cylinder 103 with one intake valve 402 is illustrated in FIG. 4, the intake valves 402 of the other cylinders 103 may be actuated in a similar manner. Also, in other embodiments, each cylinder 103 may have more than one intake valve 402 and where the present specification refers to the operation of the intake valve 402 of a cylinder 103, it also applies to the operation of all of the intake valves of a cylinder that has multiple intake valves. i.e. A reference to an intake valve 402 of a cylinder 103 being open, opening, being closed or closing, should be understood to be a reference to all of the intake valves 402 of the cylinder 103 being open, opening, being closed or closing in respect of an embodiment with multiple intake valves 402 for each cylinder 103.

In the present embodiment, the valve actuation means 309 comprises a hydraulic system of a known type which is arranged to actuate only the intake valves 402 of the engine 102. The exhaust valves 403 are actuated by direct mechanical interaction with a cam 404 on a camshaft 405, but in an alternative embodiment, the exhaust valves 403 may also be actuated by a continuous variable valve lift (CVVL) system in a similar manner to the intake valves 402.

The valve actuation means 309 comprises a cam follower 406, which is arranged to be actuated by a cam 407 located on a camshaft 408 of the engine 102. When actuated, the cam follower 406 actuates a piston 409 in a master cylinder 410 of the hydraulic system. The master cylinder 410 is hydraulically connectable via a solenoid valve 411 to a reservoir means 412 and a slave cylinder 413 comprising a piston 414. In the present embodiment, the solenoid valve 411 is biased so that connection is normally provided between the master cylinder 410 and the reservoir means 412. To actuate the intake valve 402, the solenoid valve 411 is activated to connect the master cylinder 410 to the slave cylinder 413 and isolate it from the reservoir means 412, actuation of the master cylinder 410 then causes actuation of the slave cylinder 413. When the solenoid valve 411 is deactivated, in response to a signal from the control system 104, it enables hydraulic fluid to be released into the reservoir means 412 from the master cylinder 410 and/or the slave cylinder 413, to prevent actuation of the slave cylinder 413 or allow the piston 414 of the slave cylinder 413 to return to its retracted position.

The piston 414 of the slave cylinder 413 is arranged to actuate the intake valve 402. When the intake valve 402 is actuated, as illustrated in FIG. 4, it is displaced from an intake port 415 of the cylinder 103 to allow air to be drawn into the cylinder 103.

During normal operation of the engine 102, the solenoid valve 411 provides connection between the master cylinder 410 and the slave cylinder 413, at least for a part of the period in which the cam 407 actuates the piston 409 of the master cylinder 410, during the intake stroke of the piston 401. Consequently, the piston 414 of the slave cylinder 413 is hydraulically actuated and pushes the intake valve 402 to an open position, as shown in FIG. 4. As the cam 407 is further rotated, it releases its pressure applied to the piston 409, allowing hydraulic fluid to return to the master cylinder 410 and allowing the intake valve 402 to return to a closed position in which it closes the intake port 415. Maximum lift and duration of lift of the intake valve 402 is provided when the solenoid valve 411 continuously provides hydraulic connection between the master cylinder 410 and the slave cylinder 413.

However, in response to a signal from the control system 104, the solenoid valve 411 may be moved to release hydraulic fluid to the reservoir means 412, so that even though the piston 409 in the master cylinder 410 may be actuated by the cam 407, the intake valve 402 remains closed or moves into its closed position. In this way, the height to which the intake valve 402 is lifted and the duration of the lift may be adjusted by operation of the solenoid valve 411 under the control of the control system 104.

The camshaft 408 is operatively connected to the crankshaft 108 by a chain 417 (or alternatively by a belt) in order to co-ordinate the operation of the intake valve 402 with the movement of the piston 401 of the cylinder 103. The chain 417 is driven by a crankshaft sprocket 418 fixed onto the crankshaft 108 and the chain 417 drives a camshaft sprocket 419 located on the camshaft 408. The camshaft sprocket 419 may be fixed in its position on the camshaft 408. Alternatively, as in the present embodiment (and as is known) the camshaft sprocket 419 may be attached to the camshaft 408 by a mechanism (not shown) that forms a part of the cam phasing means 310, so that the camshaft sprocket 419 is configured to be rotated relative to the camshaft 408. This enables the cam phasing means 310 to adjust the phase angle of the cam 407 relative to the crankshaft 108, so that the angles of the crankshaft 108 over which the cam 407 is able to cause opening of the intake valve 402 are adjusted. For example, the phase angle may be such that the intake valve 402 is only opened during the intake stroke of the piston 401, or may be adjusted so that the intake valve begins opening at the end of its exhaust stroke.

As illustrated in FIG. 4, a fuel injector 420 forming a part of the fuel injection system 306 is positioned in the cylinder 103 to provide an injection of fuel directly into the cylinder 103 under the control of the control system 104. Also, an ignition device 416, such as a spark plug, that forms a part of the ignition system 307 is provided in the cylinder 103 to ignite fuel and air mixtures present within the cylinder 103.

In alternative embodiments, the valve actuation means 309 may comprise another type of variable valve lift system, such as an electrical system comprising solenoids or electric motors that are arranged to actuate the intake valves 402 of the engine 102 directly.

Figure 5:
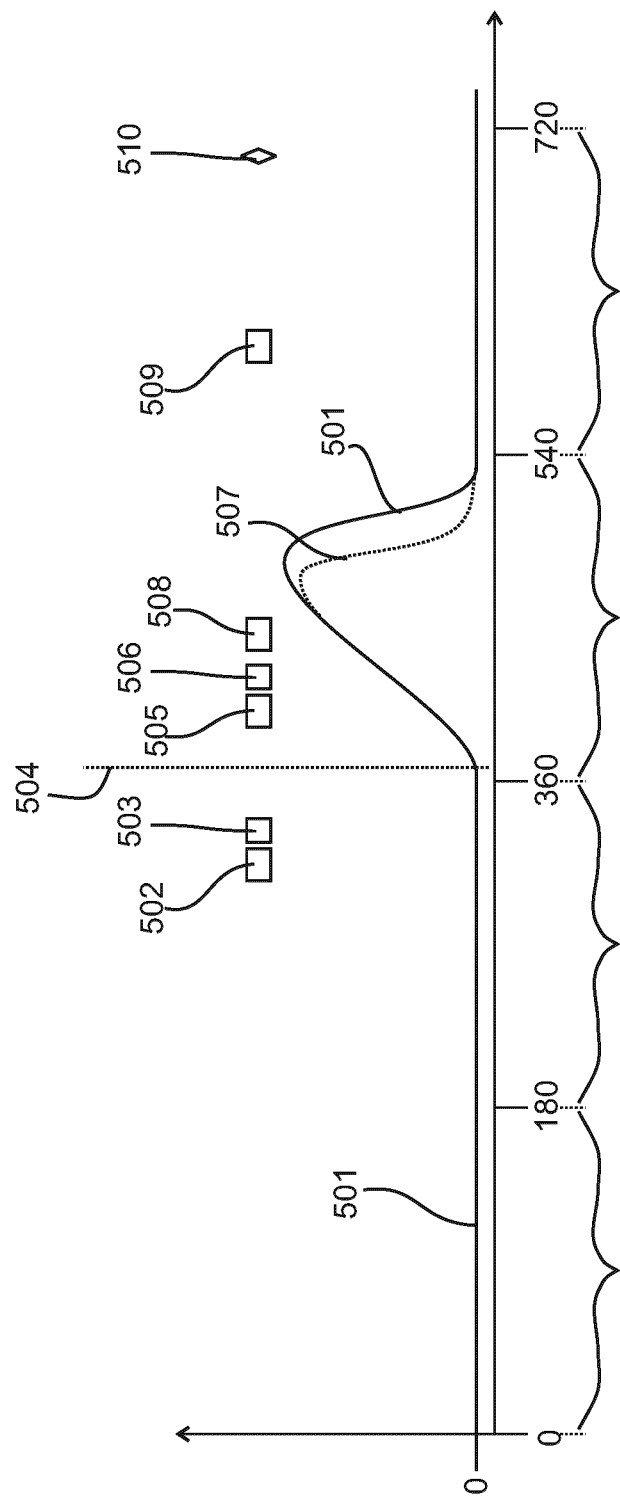
FIG. 5 shows a graph of intake valve lift versus crankshaft angle, which illustrates the operation of the control system.

A graph of intake valve lift versus crankshaft angle, which illustrates the operation of the control system 104 is shown in FIG. 5. The curve 501 shown as a solid line on the graph illustrates operation of the intake valve 402 during a period in which the engine 102 is producing torque and opening of the intake valve has not been advanced by the cam phasing means 310. The crankshaft angles indicated on the horizontal axis of the graph are angles following a zero degree position at which the piston 401 of the cylinder 103 is at top dead centre at the start of its power stroke. The power stroke is followed by an exhaust stroke between 180 and 360 degrees, an intake stroke between 360 and 540 degrees and a compression stroke between 540 and 720 degrees before the next power stroke begins at 720 degrees.

The block 502 shown on the graph represents a period during the exhaust stroke in which the control system 104 determines, from a most recently received torque demand, a mass of air and a mass of fuel that is to be provided to the cylinder 103 and hence determines at what crankshaft angles the intake valve 402 is to be opened and closed and at what crankshaft angle fuel is to be injected. Schedule data indicating the crankshaft angles for opening and closing the intake valve 402 are then provided to the VCM 308 during a period indicated by block 503 on the graph. For example, the schedule data received by the VCM 308 at block 503 may be configured to cause the VCM 308 to open and close the intake valve 402 as illustrated by the solid line curve 501.

Thus, the intake valve 402 is caused to begin opening at a crankshaft angle 504. After opening at the crankshaft angle 504, during a period represented by block 505 on the graph, the control system 104 determines whether a further request for torque has been received that requires a different amount of torque to be produced by the engine 102, and, if so, then an updated crankshaft angle for closing the intake valve 402 is determined and provided to the VCM 308 during a period represented by a block 506 on the graph. For example, if a torque demand received while the intake valve 402 is open is less than the torque demand received before block 502, then the VCM 308 may be provided with data to cause it to close the intake valve 402 sooner than was originally scheduled at block 502. Consequently, the intake valve 402 may be closed as indicated by the dotted line curve 507.

During the period represented by block 505, the control system 104 may also determine an updated schedule for fuel injection so that, for example the injection start time and/or end time is varied in order to reduce the mass of fuel injected into the cylinder. The fuel is then caused to be injected during the updated schedule at block 508.

It may be noted that, the updated schedule for fuel injection must be determined before the original scheduled time for commencing fuel injection that was determined during period 502. i.e. the fuel injection can only be rescheduled if it has not already begun. Similarly, it is necessary to provide the updated schedule data for closing the intake valve 402 before the fuel injection begins as scheduled at period 502, otherwise it could result in the ratio of mass of air drawn into the cylinder 103 to the mass of fuel injected being incorrect. Consequently, the fuel injection and the intake valve closing are only rescheduled during the period 505 if there is sufficient time to perform rescheduling before the fuel injection is scheduled to begin (as was determined at period 502).

During the compression stroke, and during a period represented on the graph by block 509, an ignition timing is scheduled in dependence on the mass of fuel injected and/or the mass of air drawn into the cylinder 103. The mass of air may be determined from the intake valve opening time 504 as scheduled at period 502 and the intake valve closing time as scheduled at period 505, or as scheduled at period 502 if rescheduling at period 505 was not performed.

The ignition of the air and fuel mixture (represented by a rhombus 510) is then performed at an angle of the crankshaft 108 as scheduled during the period 509.

By rescheduling the fuel injection and rescheduling closing of the intake valve 402 at block 505, the engine 102 is able to provide torque during following the power stroke that is consistent with the most recently received torque demand. Consequently, the responsiveness of the vehicle 100 to changes in torque request is improved.

Figure 6:
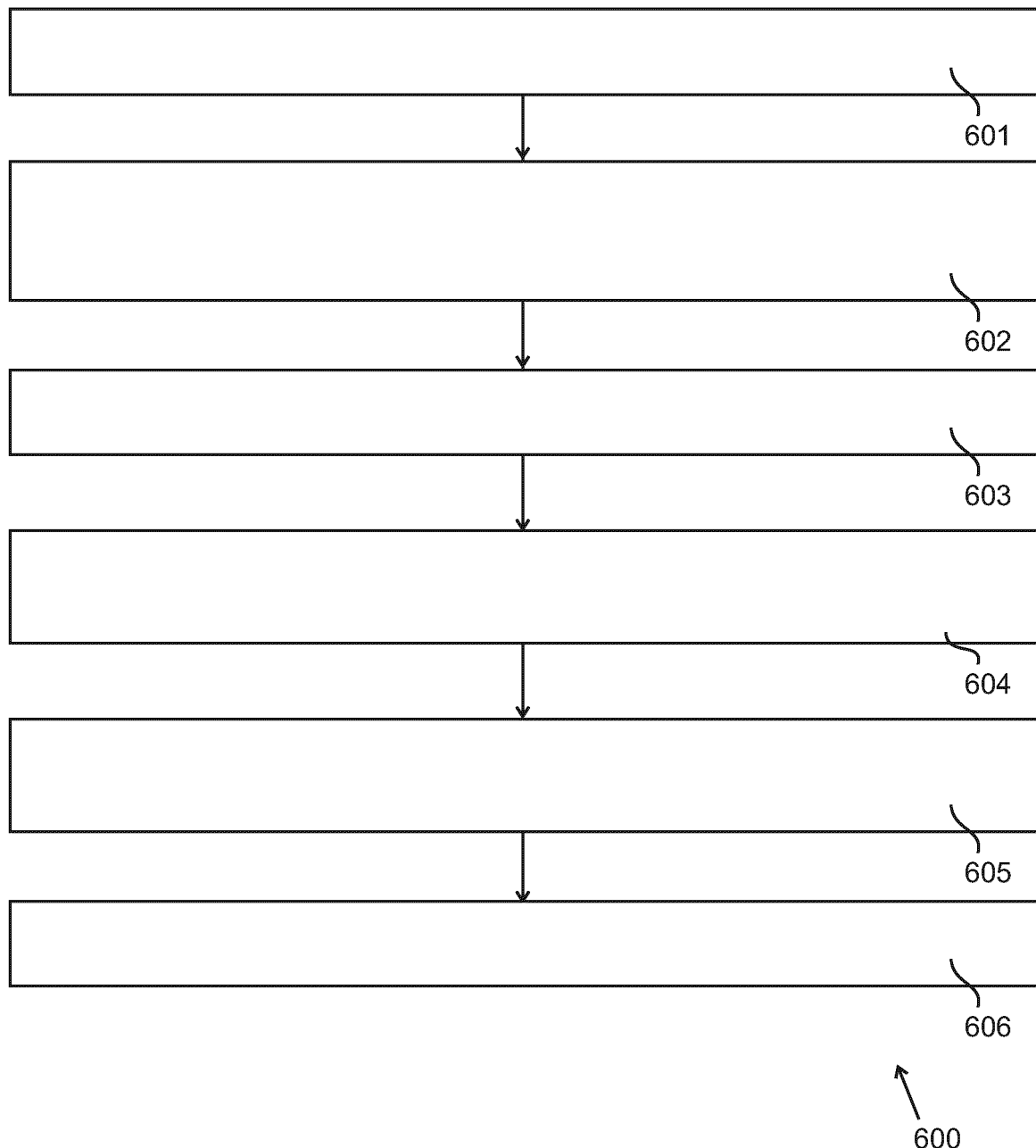
FIG. 6 shows a flowchart illustrating a method of controlling an internal combustion engine.

A flowchart illustrating a method 600 of controlling an internal combustion engine 102 and performable by the control system 104 is shown in FIG. 6. At block 601 of the method 600, a first request signal is received that is indicative of a first torque demand, and a schedule is determined at block 602 in dependence on the first torque demand received at block 601. The schedule determined at block 602 defines an opening timing of the intake valve and a closing timing of the intake valve for a cylinder 103 of the engine 102. The determination at block 602 may be performed when the signals from the sensing device 302 indicates that the crankshaft 108 has rotated to a predetermined angle at which the determination is scheduled to take place. At block 603 the intake valve 402 is cause to be opened in accordance with the schedule produced at block 602. For example, in the embodiment of FIGS. 2 and 3, the intake valve 402 may be caused to be opened at the scheduled timing by providing scheduling data to the VCM 308, so that the VCM 308 provides an output signal to the solenoid valve 411 of the valve actuation means 309. At block 604, during a period in which the intake valve 402 is still open, after being opened at block 603, a second torque request signal is received that is indicative of a second torque demand different to the first torque demand. While the intake valve 402 remains open, an updated schedule defining an updated closing timing of the intake valve is determined at block 605 in dependence on the second torque demand. The intake valve 402 is then caused to close in accordance with the updated schedule at block 606. For example, in the embodiment of FIGS. 2 and 3, the intake valve 402 may be caused to be closed at the scheduled timing by providing updated scheduling data to the VCM 308, so that the VCM 308 provides an output signal to the solenoid valve 411 of the valve actuation means 309 in accordance with the updated schedule data and thereby cause the intake valve 402 to close. It will be appreciated that the method 600 is repeated during each combustion cycle of the cylinder 103.

Figure 7:
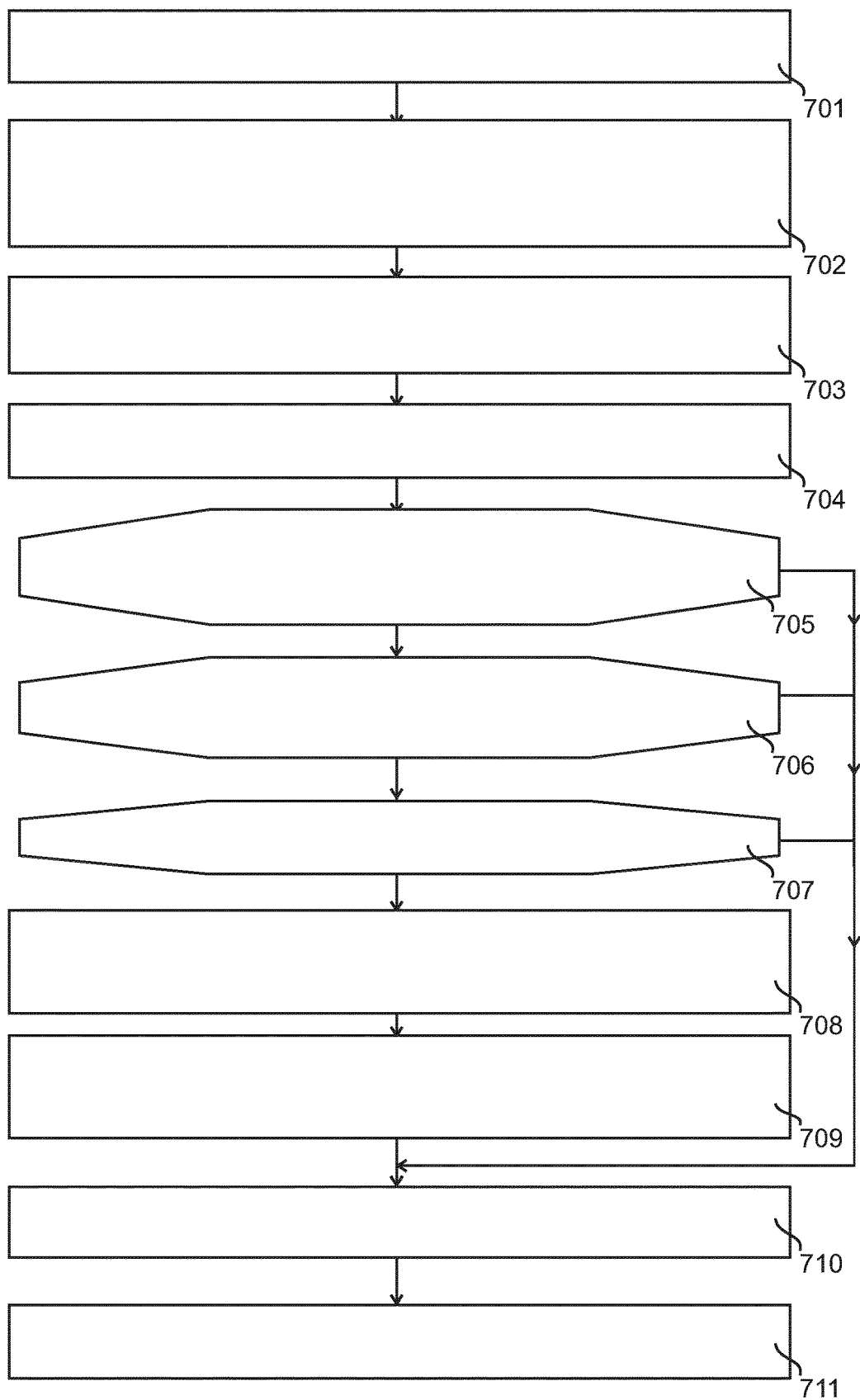
FIG. 7 shows a flowchart illustrating a method that provides an example of the method of FIG. 6.

A flowchart illustrating a method 700 that provides an example of the method 600 is shown in FIG. 7. At block 701 of the method 700 a first torque request signal indicative of a first torque demand is received, and a schedule is determined at block 702 in dependence on the first torque demand received at block 701. The schedule determined at block 702 defines an opening timing of the intake valve and a closing timing of the intake valve for a cylinder 103 of the engine 102. Blocks 701 and 702 are therefore like blocks 601 and 602 described above with reference to FIG. 6.

At block 703 a schedule defining an injection of fuel into the cylinder 103 is determined. The schedule defines the timing for the start of the fuel injection, and a quantity of fuel to be injected, either in terms of the mass or volume of the fuel or the timing of the end of the injection.

At block 704 the intake valve 402 is caused to open in accordance with the schedule determined at block 702.

At block 705 it is determined whether a second torque request signal indicative of a second torque demand that is different to the first torque demand has been received. If such a second torque request signal has not been received, then fuel is cause to be injected at block 710 in accordance with the schedule produced at block 703 and the intake valve 402 is closed at block 711 in accordance with the schedule produced at block 702.

Alternatively, if it is determined at block 705 that a different second torque demand has been received, it is determined at block 706 whether fuel injection was scheduled (at block 703) to occur before an updated schedule can be determined (at block 709). If fuel injection is scheduled to occur before it is possible to update scheduling of fuel injection, fuel is cause to be injected at block 710 in accordance with the schedule produced at block 703 and the intake valve 402 is closed at block 711 in accordance with the schedule produced at block 702. Alternatively, if it is determined at block 706 that there is sufficient time to reschedule the fuel injection, the process at block 707 is performed.

At block 707 it is determined whether the engine speed, i.e. the speed of rotation of the crankshaft 108 is above a threshold value. For example, in the present embodiment, it is determined whether the engine speed is above 3000 rpm (revolutions per minute). If it is, then it is unlikely that there is sufficient time for schedules to be updated at block 708 and 709, and consequently fuel is injected at block 710 as scheduled at block 703 and the intake valve 402 is closed at block 711 as scheduled at block 702. It may also be noted that at such very high engine speeds (above 3000 rpm) the responsiveness of the vehicle 100 by not causing rescheduling is less than it is at lower speeds (such as at 1000 rpm), and therefore a lack of responsiveness is less apparent to a person driving the vehicle 100.

If it is determined at block 707 that the engine speed is not above the threshold value, then at block 708, an updated mass of air and an updated schedule defining an updated closing timing of the intake valve is determined in dependence on the second torque demand. For example, at block 708 an updated mass of air that is required to meet the second torque demand is determined, and the updated closing timing for the intake valve 402 is arranged to allow that updated mass of air to be drawn into the cylinder 103. At block 709 an updated schedule defining injection of fuel is determined in dependence on the updated mass of air determined at block 708. Fuel is then injected at block 710 in accordance with the updated scheduled determined at block 709, and the intake valve 402 is closed in accordance with the updated schedule determined at block 708.

It will be appreciated that the method 700 is repeated during each combustion cycle of the cylinder. Consequently, in combustion cycles in which a second torque demand is received while the intake valve 402 is open, the intake valve 402 is caused to close at a time (i.e. a crankshaft angle) that depends on the second torque demand, but in combustion cycles in which such a second torque request is not received, the intake valve 402 is caused to close at a time that depends on the first torque request.

Figure 8:
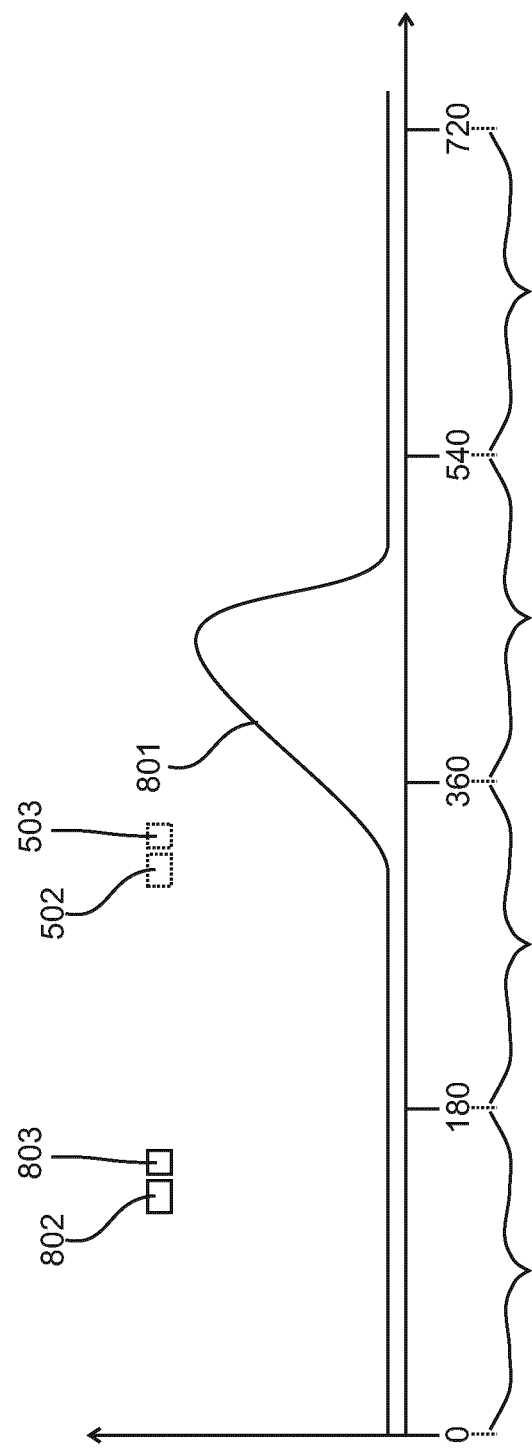
FIG. 8 shows a graph of intake valve lift versus crankshaft angle, which illustrates an example when the cam phasing means has caused the timing of the intake valve to be advanced.

As mentioned above, an engine 102 may also comprise a cam phasing means 310 to enable the opening timing of intake valve 402 to be advanced. FIG. 8 shows a graph of intake valve lift versus crankshaft angle, which illustrates an example when the cam phasing means 310 has caused the timing of the intake valve 402 to be advanced so that opening of the intake valve begins during the exhaust stroke of the piston 401. It will be apparent from this graph that the period 502 in which the intake valve opening was scheduled, as described with reference to FIG. 5, would result in the schedule data being passed on to the VCM 308 only after the intake valve is required to be opened. Consequently, in the present embodiment, scheduling of opening of the intake valve 402 is performed 180 degrees earlier (i.e. during the power stroke) so that schedule data may be provided to the VCM 308 in a following period 803 and before opening of the intake valve 402 is likely to begin.

Figure 9:
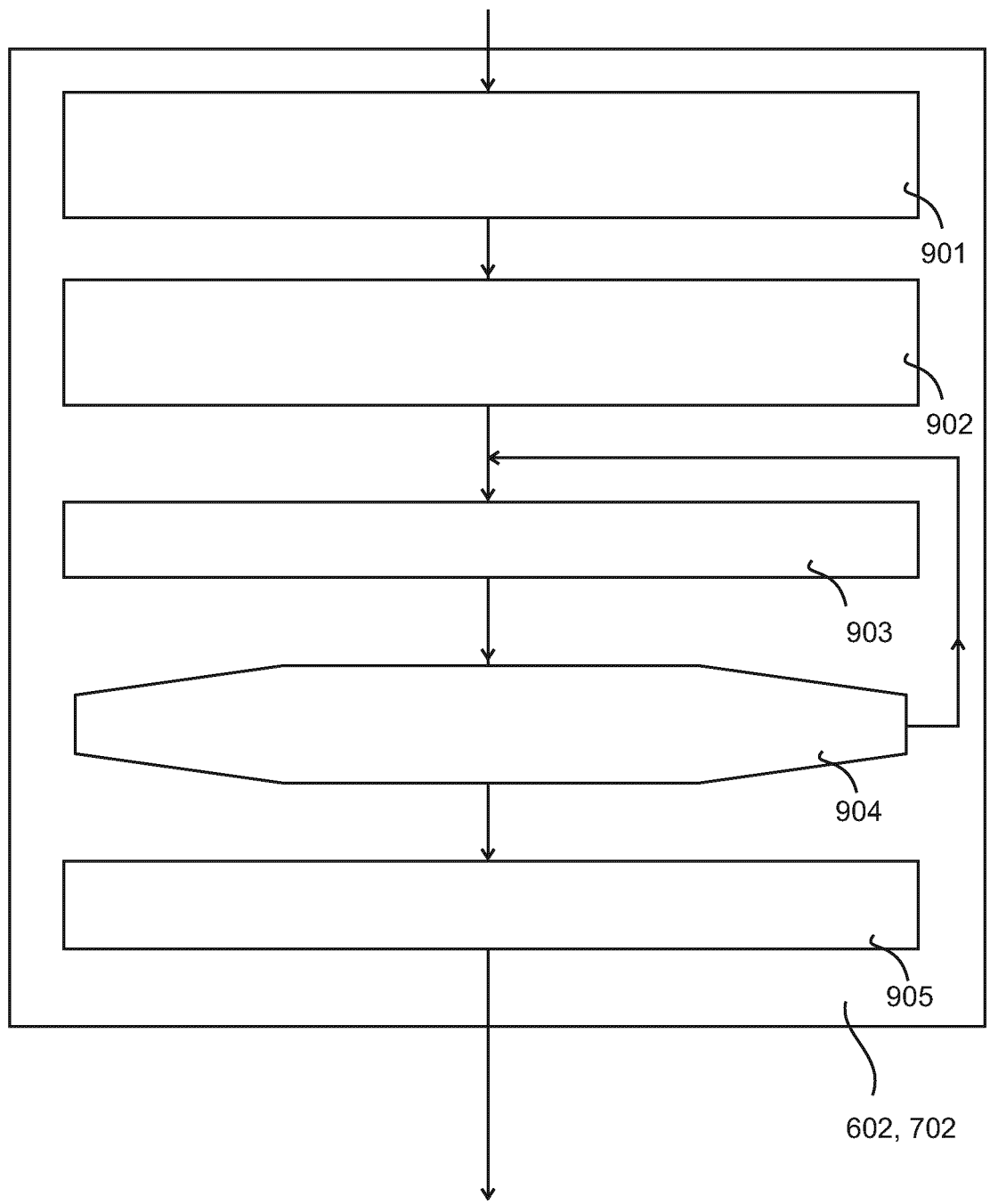
FIG. 9 shows a flowchart illustrating an example of processes within the method of FIG. 6 or FIG. 7.

An example of the processes at block 602 of the method 600, or block 702 of the method 700, are shown in the flowchart of FIG. 9, which illustrate how the earlier scheduling in the period 802 of FIG. 8 may be achieved.

At block 901 a phase angle by which opening of the intake valve 402 is advanced relative to angular position of the crankshaft 108 is determined. As is known, this phase angle is typically determined by the control system 104 in dependence on the previously received torque request and the current engine speed (i.e. speed of rotation of the crankshaft 108). At block 902, in dependence on the phase angle, a crankshaft angle is determined at which a schedule for opening of the intake valve 402 is to be determined. For example, it may be determined at block 902 whether the phase angle is less than a threshold angle and if so then scheduling of the intake valve opening may be performed during the exhaust stroke during the period 502 as shown in FIG. 5, but if the threshold angle is greater than the threshold angle scheduling of the intake valve opening is performed earlier, during the power stroke during period 802 as shown in FIG. 8. At block 903 a signal is received indicative of the current crankshaft angle, for example from the sensing device 302, and at block 904 it is determined whether the signal indicates that the crankshaft 108 has reached the angle at which the schedule for intake valve opening is to be determined. If not, then the processes at blocks 903 and 904 are repeated until it is determined at block 904 that the crankshaft 108 has reached the angle at which the schedule for intake valve opening is to be determined. A schedule defining the opening timing of the intake valve and closing timing of the intake valve is then determined at block 905 to complete the process at block 602 of the method 600 or block 702 of the method 700.

Figure 10:
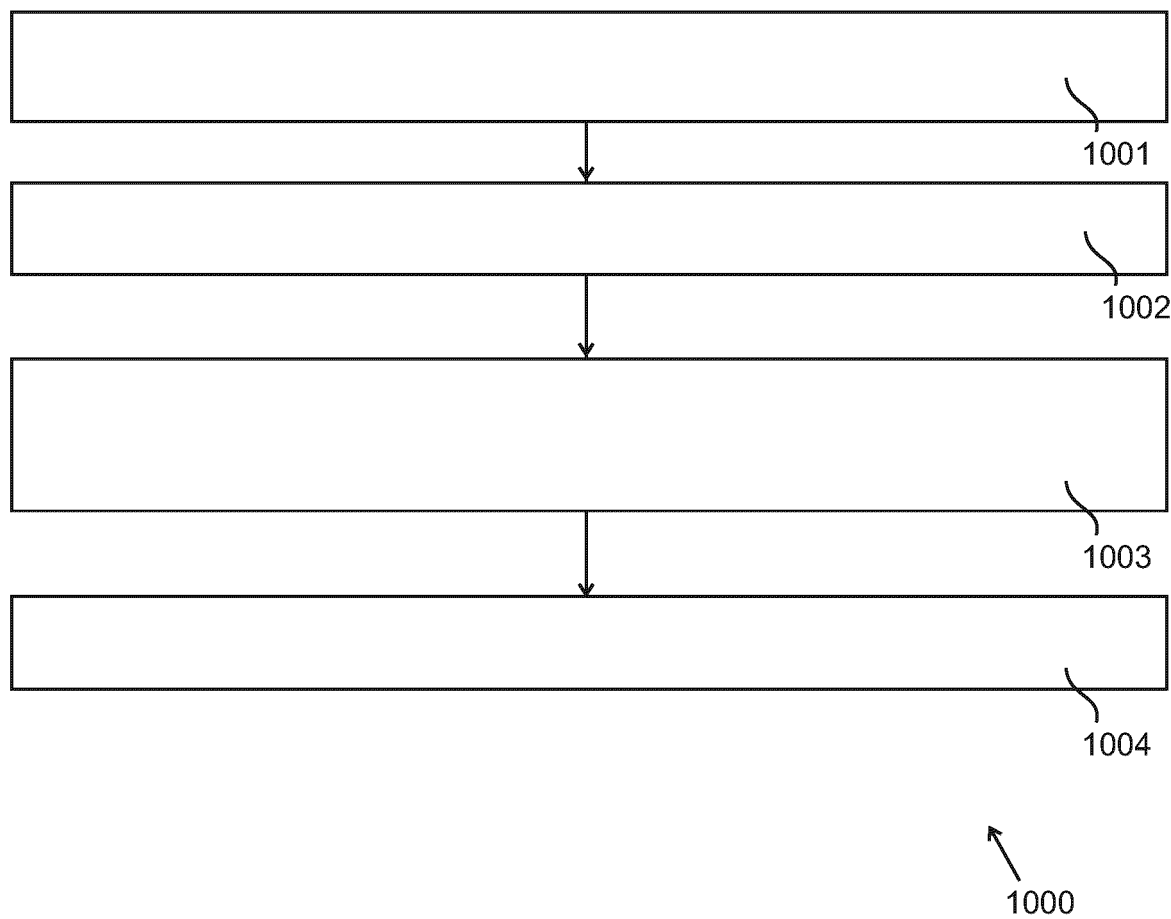
FIG. 10 shows a flowchart illustrating a method for controlling operation of intake valves of an internal combustion engine performable by a valve control module.

A flowchart illustrating a method 1000 for controlling operation of intake valves of an internal combustion engine 102 that is performable by the valve control module (VCM) 308 is shown in FIG. 10. At block 1001 of the method 1000, first schedule data is received indicative of when opening of an intake valve 402 of a cylinder 103 of the internal combustion engine 102 is to be performed. For example, in the embodiment of FIGS. 2 and 3, the first schedule data is received from the scheduling means 305 of the control system 104. At block 1002 the intake valve 402 is caused to open as defined by the first schedule data. For example, in the embodiment of FIGS. 2 and 3, the VCM 308 may provide an output signal to the solenoid 411 to cause it to open at the scheduled time. At block 1003, second schedule data is received during a period in which the intake valve 402 is open. The second schedule data is indicative of when closing of the intake valve 402 is scheduled to be performed. At block 1004 a signal is output to cause closing of the intake valve at a time defined by the second schedule data. For example, in the embodiment of FIGS. 2 and 3 the output signal is provided to the solenoid valve of the valve actuation means 309 to cause opening of the intake valve 402 at the scheduled timing. The method 1000 is repeated during each combustion cycle of an engine 102.

Figure 11:
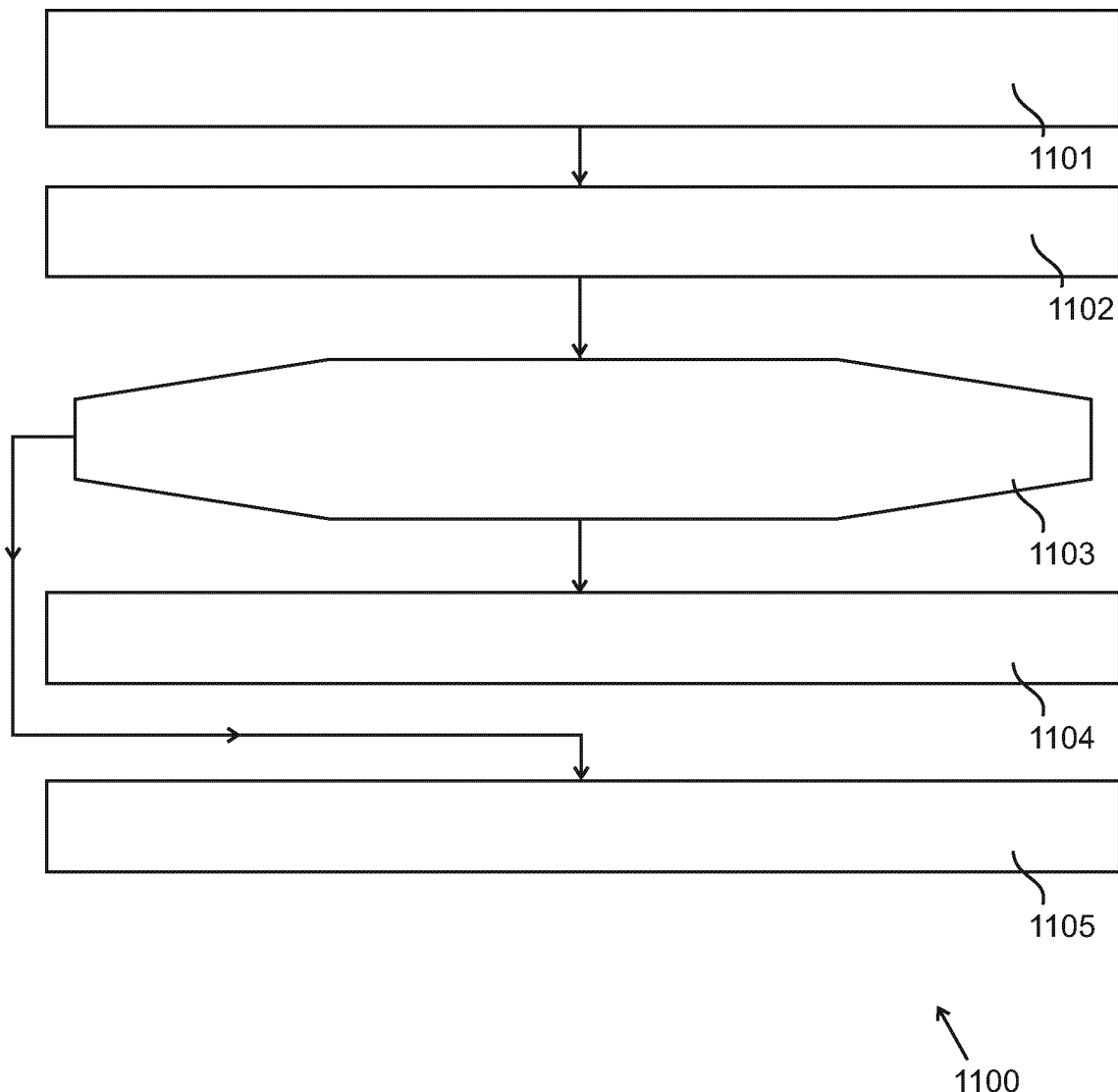
FIG. 11 shows a flowchart illustrating a method that provides an example of the method of FIG. 10.

A flowchart illustrating a method 1100 that provides an example of the method 1000 is shown in FIG. 11. At block 1101 of the method 1100, first schedule data is received defining timings for opening and closing of an intake valve 402 of a cylinder 103 of the internal combustion engine 102. At block 1102 the intake valve 402 is caused to open at a time as defined by the first schedule data. At block 1103, it is determined whether second schedule data has been received during a period in which the intake valve 402 is open. The second schedule data is indicative of when closing of the intake valve 402 is scheduled to be performed. If it is determined at block 1103 that second schedule data has been received, a signal is output at block 1104 to cause closing of the intake valve 402 at a time defined by the second schedule data. However, if it is determined at block 1103 that second schedule data has not been received, a signal is output at block 1105 to cause closing of the intake valve 402 at a time defined by the first schedule data. It will be appreciated that the method 1100 is repeated during each combustion cycle. Consequently, in combustion cycles in which second schedule data is received, the intake valve 402 is caused to close at a time (i.e. a crankshaft angle) defined by the second schedule data, but in combustion cycles in which second schedule data is not received, the intake valve 402 is caused to close at a time defined by the first schedule data.

For purposes of this disclosure, it is to be understood that the control system described herein can comprise a control unit or computational device having one or more electronic processors. A vehicle and/or a system thereof may comprise a single control unit or electronic controller or alternatively different functions of the control system may be embodied in, or hosted in, different control units or controllers. A set of instructions could be provided which, when executed, cause said controller(s) or control unit(s) to implement the control techniques described herein (including the described method(s)). The set of instructions may be embedded in one or more electronic processors, or alternatively, the set of instructions could be provided as software to be executed by one or more electronic processor(s). For example, a first controller may be implemented in software run on one or more electronic processors, and one or more other controllers may also be implemented in software run on one or more electronic processors, optionally the same one or more processors as the first controller. It will be appreciated, however, that other arrangements are also useful, and therefore, the present disclosure is not intended to be limited to any particular arrangement. In any event, the set of instructions described above may be embedded in a computer-readable storage medium (e.g., a non-transitory computer-readable storage medium) that may comprise any mechanism for storing information in a form readable by a machine or electronic processors/computational device, including, without limitation: a magnetic storage medium (e.g., floppy diskette); optical storage medium (e.g., CD-ROM); magneto optical storage medium; read only memory (ROM); random access memory (RAM); erasable programmable memory (e.g., EPROM and EEPROM); flash memory; or electrical or other types of medium for storing such information/instructions.

It will be appreciated that various changes and modifications can be made to the present invention without departing from the scope of the present application. The blocks illustrated in the FIGS. 6, 7, 9, 10 and 11 may represent steps in a method and/or sections of code in the computer program 204. The illustration of a particular order to the blocks does not necessarily imply that there is a required or preferred order for the blocks and the order and arrangement of the block may be varied. Furthermore, it may be possible for some steps to be omitted.

Although embodiments of the present invention have been described in the preceding paragraphs with reference to various examples, it should be appreciated that modifications to the examples given can be made without departing from the scope of the invention as claimed. Features described in the preceding description may be used in combinations other than the combinations explicitly described. Although functions have been described with reference to certain features, those functions may be performable by other features whether described or not. Although features have been described with reference to certain embodiments, those features may also be present in other embodiments whether described or not. Whilst endeavoring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

The invention claimed is:

1. A system for controlling operation of an intake valve of a cylinder of an internal combustion engine, the system comprising:
   a valve control module configured to receive first schedule data indicative of when opening of an intake valve of a cylinder of the internal combustion engine is to be performed;
   cause opening of the intake valve at a time defined by the first schedule data;
   during a period in which the intake valve is open within at least one combustion cycle, receive second schedule data indicative of when closing of the intake valve is to be performed; and
   cause closing of the intake valve at a time defined by the second schedule data.

2. A system according to claim 1, wherein the valve control module is operatively connected to a valve actuation mechanism configured to cause opening of the intake valve of the cylinder of the internal combustion engine in dependence on a received signal and allow a crankshaft angle at which the intake valve is actuated to be varied.

3. A system according to claim 2, wherein the valve actuation mechanism comprises a hydraulic system.

4. A system according to claim 2, wherein the valve actuation mechanism comprises a continuously variable valve lift system.

5. A system according to claim 4, wherein the valve actuation mechanism comprises a hydraulic system.

6. A system according to claim 2, wherein the valve actuation mechanism comprises an electrical system.

7. A system according to claim 6, wherein the valve actuation mechanism comprises at least one solenoid or motor.

8. An internal combustion engine comprising the system of claim 1.

9. A vehicle comprising the system of claim 1.

10. A method of controlling operation of an intake valve of an internal combustion engine, the method comprising:
receiving first schedule data indicative of when opening of an intake valve of a cylinder of the internal combustion engine is to be performed;
causing opening of the intake valve at a time defined by the first schedule data;
during a period in which the intake valve is open within at least one combustion cycle, receiving second schedule data indicative of when closing of the intake valve is to be performed; and
causing closing of the intake valve at a time defined by the second schedule data.

11. A non-transitory computer readable medium comprising computer readable instructions that, when executed by a processor, cause performance of the method according to claim 10.

12. A method of controlling an internal combustion engine comprising:
receiving a first request signal indicative of first torque demand;
determining a schedule defining an opening timing of an intake valve and a closing timing of the intake valve for a cylinder of the internal combustion engine in dependence on the first torque demand;
causing the intake valve to open in accordance with the schedule; and
during a period in which the intake valve is open:
receiving a second torque request signal indicative of a second torque demand different to the first torque demand;
determining an updated schedule defining an updated closing timing of the intake valve in dependence on the second torque demand; and
causing the intake valve to close in accordance with the updated schedule,
wherein the method comprises determining the updated schedule in dependence on the second torque request being received before an injection of fuel that is scheduled to start during said period in which the intake valve is open.

13. A method according to claim 12, comprising determining timing of said scheduled injection in dependence on the first torque demand.

14. A method according to claim 12, comprising determining an updated schedule defining timing of injection of fuel and/or quantity of fuel to be injected in dependence on the second torque demand.

15. A method according to claim 12, comprising determining whether the internal combustion engine has a speed of rotation below a threshold value and determining the updated schedule defining the updated closing timing of the intake valve only when the internal combustion engine has a speed of rotation below a threshold value.

16. A method according to claim 12, comprising:
receiving a timing signal indicating current angle of a crankshaft of the internal combustion engine;
determining a phase angle by which opening of the intake valve is advanced relative to angular position of the crankshaft; and
determining the schedule defining the opening timing of the intake valve and the closing timing of the intake valve, at a time defined by a first selected angle of the crankshaft that depends on the phase angle.

17. A method according to claim 12, comprising determining an ignition timing in dependence on the opening timing of the intake valve and the updated closing timing of the intake valve.

* * * * *